United States Patent
Nam et al.

(10) Patent No.: US 11,763,244 B2
(45) Date of Patent: Sep. 19, 2023

(54) SYSTEM FOR CONTROLLING LOGISTICS TRANSFORMATION AND METHOD FOR THE SAME

(71) Applicants: Hyundai Motor Company, Seoul (KR); Kia Corporation, Seoul (KR)

(72) Inventors: Joo Han Nam, Whasung-Si (KR); Sang Hyu Lee, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/585,210

(22) Filed: Jan. 26, 2022

(65) Prior Publication Data

US 2023/0027909 A1    Jan. 26, 2023

(30) Foreign Application Priority Data

Jul. 22, 2021  (KR) .......................... 10-2021-0096662

(51) Int. Cl.
| | | |
|---|---|---|
| *G06Q 10/08* | (2023.01) | |
| *G06Q 50/30* | (2012.01) | |
| *B60W 60/00* | (2020.01) | |
| *H04W 12/037* | (2021.01) | |

(52) U.S. Cl.
CPC ............ *G06Q 10/08* (2013.01); *G06Q 50/30* (2013.01); *H04W 12/037* (2021.01); *B60W 60/00256* (2020.02); *B60W 2300/145* (2013.01); *B60W 2556/45* (2020.02)

(58) Field of Classification Search
CPC ..... G06Q 10/08; G06Q 50/30; H04W 12/037; B60W 2556/45; B60W 60/00256; B60W 2300/145

USPC .......................................................... 705/13
See application file for complete search history.

(56) References Cited

U.S. PATENT DOCUMENTS

| | | | |
|---|---|---|---|
| 7,307,514 B2 | 12/2007 | McAden | |
| 2013/0342343 A1* | 12/2013 | Harring | ................. H04L 63/102 340/521 |
| 2019/0082149 A1* | 3/2019 | Correnti | ........... G08B 13/19613 |
| 2020/0143320 A1* | 5/2020 | Ahmadi | ............. G06Q 10/0833 |
| 2020/0307329 A1* | 10/2020 | Köster | .............. B60W 60/0025 |
| 2022/0118942 A1 | 4/2022 | Nam et al. | |

FOREIGN PATENT DOCUMENTS

| | | |
|---|---|---|
| KR | 10-2019-0088135 A | 7/2019 |
| KR | 10-2022-0051675 A | 4/2022 |

OTHER PUBLICATIONS

"Nonlinear modeling and identification of an autonomous tractor-trailer system" Published by Elsevier (Year: 2014).*

* cited by examiner

*Primary Examiner* — Zeina Elchanti
(74) *Attorney, Agent, or Firm* — MORGAN, LEWIS & BOCKIUS LLP

(57) ABSTRACT

A system and a method for controlling logistics transportation includes a control server to transmit position information of a trailer to an autonomous tractor, and a trailer managing device to receive information on an identification of the autonomous tractor from the control server and to open a door of a warehouse corresponding to the position information of the trailer, when information on an identification of an autonomous tractor, which is extracted from a surrounding image of the warehouse corresponding to the position information of the trailer is matched with the received information on the identification of the autonomous tractor.

16 Claims, 6 Drawing Sheets

SYSTEM FOR CONTROLLING LOGISTICS TRANSFORMATION AND METHOD FOR THE SAME

CROSS-REFERENCE TO RELATED APPLICATION

The present application claims priority to Korean Patent Application No. 10-2021-0096662, filed on Jul. 22, 2021, the entire contents of which is incorporated herein for all purposes by this reference.

BACKGROUND OF THE INVENTION

Field of the Invention

The present invention relates to a technology of controlling the coupling between a plurality of tractors and a plurality of trailers under a hub-to-hub logistics transportation environment.

Description of Related Art

Recently, there has been suggested an automatic transportation system between logistics bases, capable of orienting green logistics, reducing the congestion rate of a road by reducing a transportation share of a truck, and solving the problem related to the accessibility of a rail transportation, by eco-friendly automating logistics transportation made between logistics bases through an automated guided vehicle.

The automatic transportation system includes an exclusive road having a plurality of transducers buried under the ground, an automated guided vehicle to transport a container while traveling on the exclusive road, a vehicle to travel with the container received from the automated guided vehicle between the logistics bases, and a control tower to control the traveling state of the automated guided vehicle and the vehicle.

In the instant case, the vehicle includes a trailer to receive and load the container received from the automated guided vehicle, and a tractor coupled to a front surface of the trailer to carry the container. Furthermore, the trailer includes a frame having an internal space portion, which allows the automated guided vehicle including a container loaded thereon to enter or exit, a wheel coupled to a lower portion of the frame, a lift device mounted at an upper portion of the frame to fixedly support the container, and couplers mounted at opposite ends of the frame.

The automation transportation system between the logistics bases fails to restrict the access of the tractor to each trailer, and to individually manage information on a trailer to be transported by the tractor. Accordingly, the automation transportation system fails to block the tractor form transporting a trailer different from a trailer allocated to the tractor.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for controlling logistics transportation and a method for the same, facilitating a control server to transmit position information of a trailer, which is to be transported by a tractor authenticated, to the tractor, and to transmit information on an identification of the tractor to a trailer managing device, and facilitating the trailer managing device to identify the tractor and to open a door of the warehouse corresponding to the position information of the trailer, preventing the tractor from transporting a trailer different from trailer allocated to the tractor in advance and safely managing a plurality of trailers.

The technical problems to be solved by the present invention are not limited to the aforementioned problems, and any other technical problems not mentioned herein will be clearly understood from the following description by those skilled in the art to which various exemplary embodiments of the present invention pertains. Furthermore, it can be easily understood that the objects and the features of the present invention are realized by means and the combination of the means claimed in appended claims.

According to various aspects of the present invention, a system for controlling logistics transportation may include a control server to transmit position information of a trailer to an autonomous tractor and a trailer managing device to receive information on an identification of the autonomous tractor from the control server and to open a door of a warehouse corresponding to the position information of the trailer, when information on an identification of an autonomous tractor, which is extracted from a surrounding image of the warehouse corresponding to the position information of the trailer is matched with the received information on the identification of the autonomous tractor.

According to various exemplary embodiments of the present invention, the trailer managing device may receive information on an identification of a first autonomous tractor from the control server, extracts information on an identification of the second autonomous tractor from a surrounding image of the warehouse corresponding to the position information of the trailer, and open the door of the warehouse, when the information on the identification of the second autonomous tractor is matched with the information on the identification on the first autonomous tractor.

According to various exemplary embodiments of the present invention, the control server may manage position information of the trailer, and manage the information on the identification of the first autonomous tractor, which is matched with the position information of the trailer.

According to various exemplary embodiments of the present invention, the control server may receive information on a position of the first autonomous tractor, and transmit, to the first autonomous tractor, the position information of the trailer, when the first autonomous tractor is adjacent to the warehouse.

According to various exemplary embodiments of the present invention, the control server may encrypt the position information of the trailer to transmit the encrypted the position information of the trailer to the first autonomous tractor, and may encrypt the information on the identification of the first autonomous tractor to transmit the encrypted information on the identification of the first autonomous tractor to the trailer managing device.

According to various exemplary embodiments of the present invention, the control server may periodically receive the information on the identification of the second autonomous tractor, from the trailer managing device, and may warn a manager when the second autonomous tractor stands by around the warehouse for a predetermined time period.

According to various exemplary embodiments of the present invention, the control server may periodically receive information on the identification of the second autonomous tractor from the trailer managing device, and warns the manager when the second autonomous tractor turns around the warehouse.

According to various exemplary embodiments of the present invention, the trailer managing device may decrypt the encrypted information on the identification of the first autonomous tractor, when receiving the encrypted information on the identification of the first autonomous tractor from the control server.

According to various exemplary embodiments of the present invention, the trailer managing device may periodically transmit the extracted information on the identification of the second autonomous tractor to the control server.

According to various exemplary embodiments of the present invention, the first autonomous tractor may transmit information on a position of the first autonomous tractor to the control server.

According to various exemplary embodiments of the present invention, the first autonomous tractor may decrypt the encrypted position information, when receiving the encrypted position information from the control server.

According to various exemplary embodiments of the present invention, the first autonomous tractor may display the encrypted position information.

According to various aspects of the present invention, a method for controlling logistics transportation may include transmitting, by a control server, position information of a trailer to an autonomous tractor and receiving, by a trailer managing device, information on an identification of the autonomous tractor from the control server and opening, by the trailer managing device, a door of a warehouse corresponding to the position information of the trailer, when information on an identification of an autonomous tractor, which is extracted from a surrounding image of the warehouse corresponding to the position information of the trailer is matched with the received information on the identification of the autonomous tractor.

According to various exemplary embodiments of the present invention, the method may include receiving, by the trailer managing device, information on an identification of a first autonomous tractor from the control server, extracting, by the trailer managing device, information on an identification of a second autonomous tractor from the surrounding image of the warehouse corresponding to the position information of the trailer, and opening, by the trailer managing device, the door of the warehouse, when the extracted information on the identification of the second autonomous tractor is matched with the information on the identification on the first autonomous tractor.

According to various exemplary embodiments of the present invention, the method may further include managing position information of a trailer; and managing the information on the identification of the first autonomous tractor, which is matched with the position information of the trailer.

According to various exemplary embodiments of the present invention, the method may include receiving information on a position of the first autonomous tractor, and transmitting, to the first autonomous tractor, the position information of the trailer, when the first autonomous tractor is adjacent to the warehouse.

According to an exemplary embodiment of the resent disclosure, the method may further include periodically receiving, by the control server, the information on the identification of the second autonomous tractor, from the trailer managing device, and warning, by the control server, a manager when the second autonomous tractor stands by around the warehouse.

According to an exemplary embodiment of the resent disclosure, the method may further include periodically receiving, by the control server, the information on the identification of the second autonomous tractor, from the trailer managing device, and warning, by the control server, a manager when the second autonomous tractor turns around the warehouse.

According to various exemplary embodiments of the present invention, the extracting of the information on the identification of the second autonomous tractor may include periodically transmitting the extracted information on the identification of the second autonomous tractor to the control server.

According to various exemplary embodiments of the present invention, the method may further include displaying, by the first autonomous tractor, the position information of the trailer received from the control server.

The methods and apparatuses of the present invention include other features and advantages which will be apparent from or are set forth in more detail in the accompanying drawings, which are incorporated herein, and the following Detailed Description, which together serve to explain certain principles of the present invention.

Figure 1:
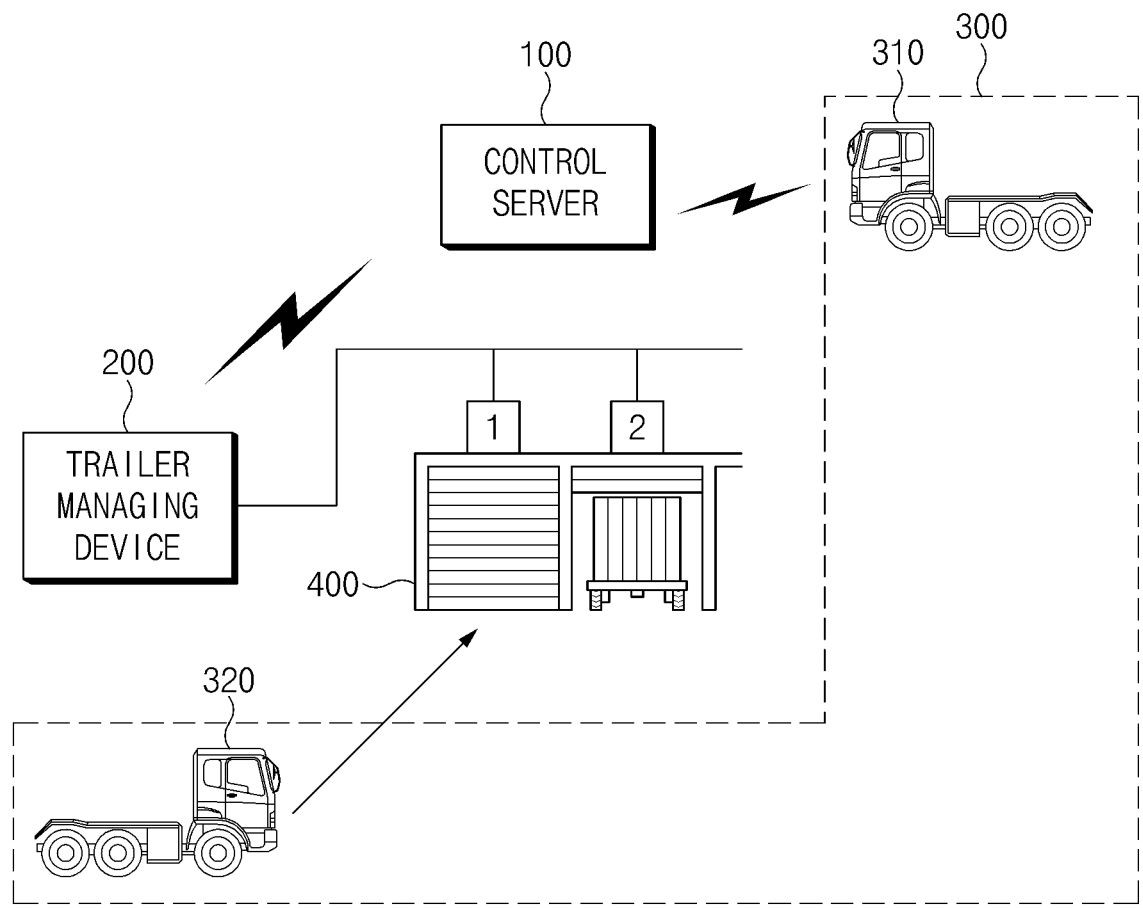
FIG. 1 is a view exemplarily illustrating the configuration of a system for controlling logistics transportation, according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, further including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

Furthermore, in the following description of components according to various exemplary embodiments of the present invention, the terms 'first', 'second', 'A', 'B', '(a)', and '(b)' may be used. These terms are merely intended to distinguish one component from another component, and the terms do not limit the nature, sequence or order of the constituent components. Furthermore, unless otherwise defined, all terms used herein, including technical or scientific terms, include the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view exemplarily illustrating the configuration of a system for controlling logistics transportation, according to various exemplary embodiments of the present invention.

As illustrated in FIG. 1, according to various exemplary embodiments of the present invention, a system for controlling logistics transportation may include a control server 100, a trailer managing device 200, a tractor 300, and a plurality of warehouses 400. In the instant case, the tractor 300 may include, for example, a first tractor 310 and a second tractor 320.

Regarding the components, the control server 100, which is a device to couple the tractor 300 to the trailer, may make communication with the trailer managing device 200 and the tractor 300 through various communication schemes.

The control server 100 may manage information (for example, a warehouse number) of a position of each trailer by interworking with the trailer managing device 200 positioned in each of hubs, and may manage information (for example, a vehicle number) of identification of the tractor 300 matched with each trailer. In the instant case, the hub refers to a place (a collection plate) in which a plurality of trailers is positioned.

The control server 100 may perform a process of determining whether the tractor 300 is a genuine vehicle which is registered, when receiving the information on the identification of the tractor 300, from the tractor 300. In the instant case, when the tractor 300 is the genuine vehicle which is registered, the control server 100 may transmit, to the tractor 300, information on a trailer matched with the tractor 300 and may transmit the information on the identification of the tractor 300 to the trailer managing device 200.

In the instant case, the control server 100 may encrypt the information on a position of the trailer matched with the tractor 300 to transmit the encrypted information on the position on the trailer to the tractor 300, and may encrypt the information on the identification of the tractor 300 to transmit the encrypted information on the identification of the tractor 300 to the trailer managing device 200.

The control server 100 may receive the information (for example, global positioning system (GPS) position information) on the position of the tractor 300, from the tractor 300, and may encrypt the information on the position of the trailer matched with the tractor 300 to transmit the encrypted information on the position of the trailer, to the tractor 300, when the tractor 300 is positioned in the vicinity of the hub (or warehouse).

The control server 100 determines that the risk of theft is present, when receiving information on identification of a tractor 300 standing by around a specific warehouse (for example, a warehouse entrance) for a specific time period, from the trailer managing device 200, and may transmit a warning signal for notifying the risk of theft to a manager, to the trailer managing device 200.

The control server 100 may receive the information on the identification of the tractor 300 in an image captured by a camera 22 provided at each warehouse 400, from the trailer managing device 200, and recognize the tractor 300 standing by around the specific warehouse for the specific time period, based on the received information on the identification of the tractor 300. In the instant case, the control server 100 may determine that the risk of theft is present and may transmit a warning signal for notifying the risk of theft to a manager, to the trailer managing device 200.

The control server 100 may receive the information on the identification of the tractor 300 in an image captured by the camera 22 provided at each warehouse 400, from the trailer managing device 200, and recognize the tractor 300 wandering (turning) around a plurality of warehouses (for example, three warehouses or more) for the specific time period, based on the received information on the identification of the tractor 300. In the instant case, the control server 100 may determine that the risk of theft is present and may transmit a warning signal for notifying the risk of theft to a manager, to the trailer managing device 200.

The trailer managing device 200, which is a device to manage whether a door provided in each warehouse 400 is open/closed, may store position information of a trailer matched with the tractor 300 by interworking with the control server 100, and may open the door of the warehouse, when the tractor 300 arrives at a vicinity of the warehouse matched with the tractor 300. For example, the trailer managing device 200 may open the door of the warehouse, when the information on the identification of the first tractor 310, which is received from the control server 100, is matched with information on the identification of the second tractor 320 in the image captured by the camera 22 provided at the warehouse.

The trailer managing device 200 may decrypt the encrypted information on the identification of the first tractor 310, when receiving the encrypted information on the identification of the first tractor 310 from the control server 100.

The trailer managing device 200 may extract the information on the identification (for example, a vehicle number) of the second tractor 320 from the image captured by the camera 22, and may transmit the extracted information on the identification of the second tractor 320 to the control server 100. In the instant case, the trailer managing device 200 may periodically (for example, every one second) perform a process of extracting the information on the identification of the second tractor 320 from the image captured by the camera 22, and may transmit the extracted information of the identification of the second tractor 320 to the control server 100.

The trailer managing device 200 may output a warning sound or a warning screen to alert a manager, when receiving the warning signal from the control server 100. For reference, the trailer, which is a vehicle towed by the tractor 300, may load various goods on the trailer through a container.

The tractor 300 may be realized by use of an autonomous vehicle, and may transport a trailer between hubs.

The tractor 300 may transmit information on the identification of the tractor 300 to the control server 100 such that the information on the identification of the tractor 300 is authenticated, and may transmit information of a position of the tractor 300 to the control server 100.

The tractor 300 may decrypt the encrypted information on a position of the trailer, which is received from the control server 100, and may output, through an output device 32, the decrypted position of the trailer.

A plurality of warehouses 400 may be provided, and a number assigned to each warehouse may be the information on the position of the trailer.

Figure 2:
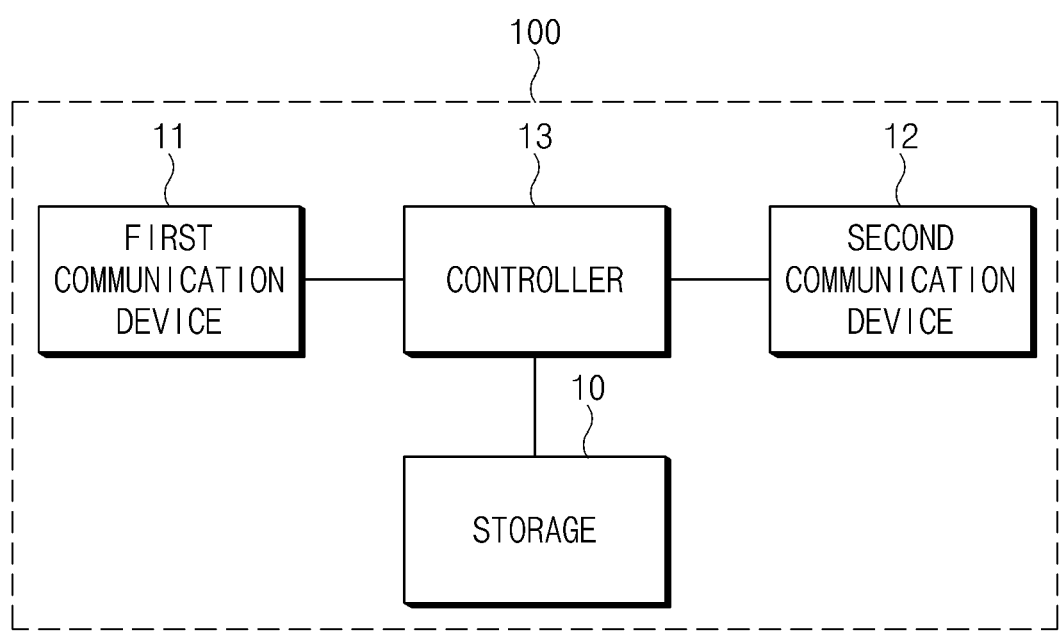
FIG. 2 is a block diagram illustrating the configuration of a control server provided in a system for controlling logistics transportation, according to various exemplary embodiments of the present invention.

FIG. 2 is a block diagram illustrating the configuration of a control server provided in a system for controlling logistics transportation, according to various exemplary embodiments of the present invention.

As illustrated in FIG. 2, according to various exemplary embodiments of the present invention, the control server 100 provided in the system for controlling logistics transportation may include a storage 10, a first communication device 11, a second communication device 12, and a controller 13. In the instant case, according to various exemplary embodiments of the present invention, the components may be combined into each other to be implemented in one form, or some components may be omitted, depending on the manners of reproducing the control server 100 provided in the system for controlling logistics transportation.

Regarding the components, the storage 10 may store various logic, various algorithms, and various programs required in a process of authenticating the tractor 300, of transmitting position information (for example, a warehouse number) of a trailer to be transported by the tractor 300, which is authenticated, to the tractor 300, and of alerting the manager through the trailer managing device 200, when the behavior of the tractor 300 is suspected.

The storage 10 may store a table including information (for example, a warehouse number) on a position of a trailer matched with information (for example, a vehicle number) of identification of the tractor 300.

The storage 10 may store an algorithm used to encrypt the information on the identification of the tractor 300 and the information on the position of the tractor.

The storage 10 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The first communication device 11, which is a module to provide a communication interface with the trailer managing device 200, may transmit the information on the identification of the tractor 300 to the trailer managing device 200. The first communication device 11 may include a wireless Internet module and a short-range communication module.

The wireless Internet module, which is a module for wireless Internet access, may make communication with a communication device 21 of the trailer managing device 200 through Wireless LAN (WLAN), Wireless-Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

The short-range communication module may make communication with the communication device 21 of the trailer managing device 200 through at least one of Bluetooth™, Radio Frequency Identification (RFID), Infrared Data Association (IrDA), Ultra Wideband (UWB), ZigBee, Near Field Communication (NFC), or Wireless Universal Serial Bus (USB).

The second communication device 12, which is a module to provide a communication interface with the tractor 300, may transmit the information (warehouse number) of the position of the trailer to the tractor 300 and may receive Global Positioning System (GPS) position information from the tractor 300. The second communication device 12 may include a mobile communication module.

The mobile communication module may make communication with a communication device 31 of the tractor 300 over a mobile communication network constructed depending on technology standards or communication schemes for mobile communication. For example, the technology standards or communication schemes for mobile communication may include Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), or Long Term Evolution-Advanced (LTEA).

The controller 13 may perform the overall control such that the components normally perform the respective functions. Furthermore, the controller 13 may be implemented in a form of hardware or software, and may be implemented in a form of the combination of the hardware and the software. The controller 13 may be implemented with a microprocessor, but the present invention is not limited thereto.

The controller 13 may perform various control operations in a process of authenticating the tractor 300, of transmitting position information of a trailer to be transported by the tractor 300, which is authenticated, to the tractor 300, and of alerting the manager through the trailer managing device 200, when the behavior of the tractor 300 is suspected.

The controller 13 may manage (or update) a table, which is stored in the storage 10, including information (for example, a warehouse number) on a position of a trailer matched with information (for example, a vehicle number) of identification of the tractor 300.

The controller 13 may perform a process of determining whether the tractor 300 is a genuine vehicle which is registered, when receiving the information on the identification of the tractor 300 through the second communication device 12. In the instant case, when the tractor 300 is the genuine vehicle which is registered, the controller 13 may control the second communication device 12 to transmit, to the tractor 300, information on a position of a trailer matched with the tractor 300 and may control the first communication device 11 to transmit the information on the identification of the tractor 300 to the trailer managing device 200.

The controller 13 may encrypt the information on a position of the trailer matched with the tractor 300 and may encrypt the information on the identification of the tractor 300.

The controller 13 may control the second communication device 12 to receive the information (for example, GPS position information) on the position of the tractor 300 through the second communication device 12, and to transmit the information on the position of the trailer matched with the tractor 300, to the tractor 300, when the tractor 300 is positioned in the vicinity of the hub (or warehouse).

The controller 13 may control the first communication device 11 to determine that the risk of theft is present, when receiving, through the first communication device 11, information on identification of a tractor 300 standing by around a specific warehouse (for example, a warehouse entrance) for a specific time period, and to transmit a warning signal for notifying the risk of theft to a manager, to the trailer managing device 200.

The controller 13 may receive the information on the identification of the tractor 300 in an image captured by the camera 22 provided at each warehouse 400, through the first communication device 11, and recognize the tractor 300 standing by around the specific warehouse for the specific time period, based on the received information on the identification of the tractor 300. In the instant case, the controller 13 may determine that the risk of theft is present and may control the first communication device 11 to transmit a warning signal for notifying the risk of theft to a manager, to the trailer managing device 200.

The controller 13 may receive the information on the identification of the tractor 300 in an image captured by the camera 22 provided at each warehouse 400, through the first communication device 11, and recognize the tractor 300 standing by around a plurality of warehouses (for example, three warehouses or more), based on the received information on the identification of the tractor 300. In the instant case, the controller 13 may determine that the risk of theft is present and may control the first communication device 11 to transmit a warning signal for notifying the risk of theft to a manager, to the trailer managing device 200.

Figure 3:
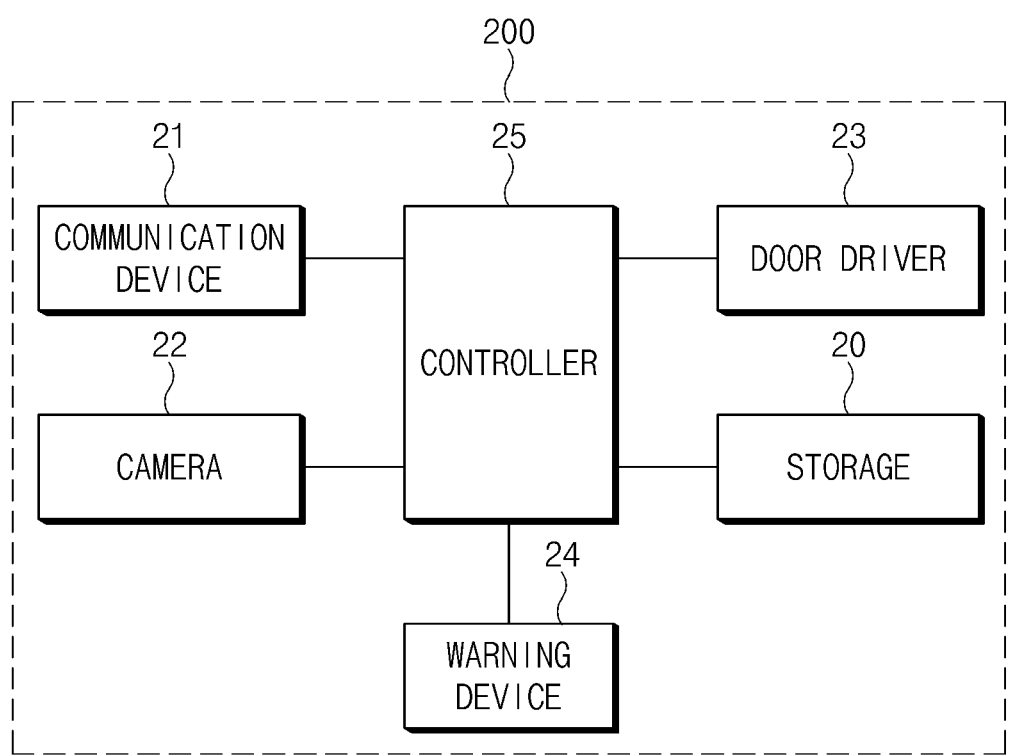
FIG. 3 is a block diagram illustrating the configuration of a trailer managing device provided in a system for controlling logistics transportation, according to various exemplary embodiments of the present invention.

FIG. 3 is a block diagram illustrating the configuration of a trailer managing device provided in a system for controlling logistics transportation, according to various exemplary embodiments of the present invention.

As illustrated in FIG. 3, according to various exemplary embodiments of the present invention, the trailer managing device 200 provided in the system for controlling logistics transportation may include a storage 20, a communication device 21, a camera 22, a door driver 23, a warning device 24, and a controller 25. In the instant case, according to various exemplary embodiments of the present invention, the components may be combined into each other to be implemented in one form, or some components may be omitted, depending on the manners of reproducing the trailer managing device 200 provided in the system for controlling logistics transportation.

Regarding the components, the storage 20 may store various logics, various algorithms, and various programs required in a process of receiving information on an identification of the first tractor 310 from the control server 100, extracting information on the identification of the second tractor 320 from a surrounding image of a warehouse including a trailer matched with the received information on the identification of the first tractor 310, and opening a door of the warehouse, when the received information on the identification of the first tractor 310 is matched with the extracted information on the identification of the second tractor 320.

The storage 20 may store a table including information (for example, a warehouse number) on a position of a trailer matched with information (for example, a vehicle number) of identification of the tractor 300.

The communication device 21, which is a module to provide a communication interface with the control server 100, may receive the information on the identification of the tractor 300 from the control server 100.

The camera 22, which is a module provided at every warehouse 400 to capture a surrounding image of the warehouse 400, may capture an image including the information on the identification (a vehicle number) of the tractor 300.

The door driver 23 may include a plurality of actuators to open or close the door of each warehouse 400.

The warning device 24, which is a module to provide a visual warning, an audible warning, or a tactile warning, may include a display device, a speaker, or a vibrator.

The controller 25 may perform the overall control such that the components normally perform the respective functions. Furthermore, the controller 25 may be implemented in a form of hardware or software, and may be implemented in a form of the combination of the hardware and the software. The controller 25 may be implemented with a microprocessor, but the present invention is not limited thereto.

The controller 25 may perform various control operations in a process of receiving information on an identification of the first tractor 310 from the control server 100, extracting information on the identification of the second tractor 320 from a surrounding image of a warehouse including a trailer matched with the received information on the identification of the first tractor 310, and opening a door of the warehouse, when the received information on the identification of the first tractor 310 is matched with the extracted information on the identification of the second tractor 320.

The controller 25 may control the door driver 23 to open the door of the warehouse, when the received information on the identification of the first tractor 310 is matched with the extracted information on the identification of the second tractor 320, which is extracted the surrounding image of the warehouse including the trailer matched with the received information on the identification of the first tractor 310.

The controller 25 may decrypt the encrypted information on the position of the trailer, when receiving the encrypted information on the position of the trailer, from the control server 100.

The controller 25 may extract the information on the identification (for example, a vehicle number) of the second tractor 320 from the image captured by the camera 22, and may control the communication device 21 to transmit the extracted information on the identification of the second tractor 320 to the control server 100. In the instant case, the controller 25 may periodically perform a process of extracting the information on the identification of the second tractor 320 from the image captured by the camera 22, and may control the communication device 21 to transmit the extracted information of the identification of the second tractor 320 to the control server 100.

The controller 25 may control the warning device 24 to perform a warning operation, based on at least one of a warning sound, a warning screen, or a warning vibration, when receiving the warning signal from the control server 100.

Figure 4:
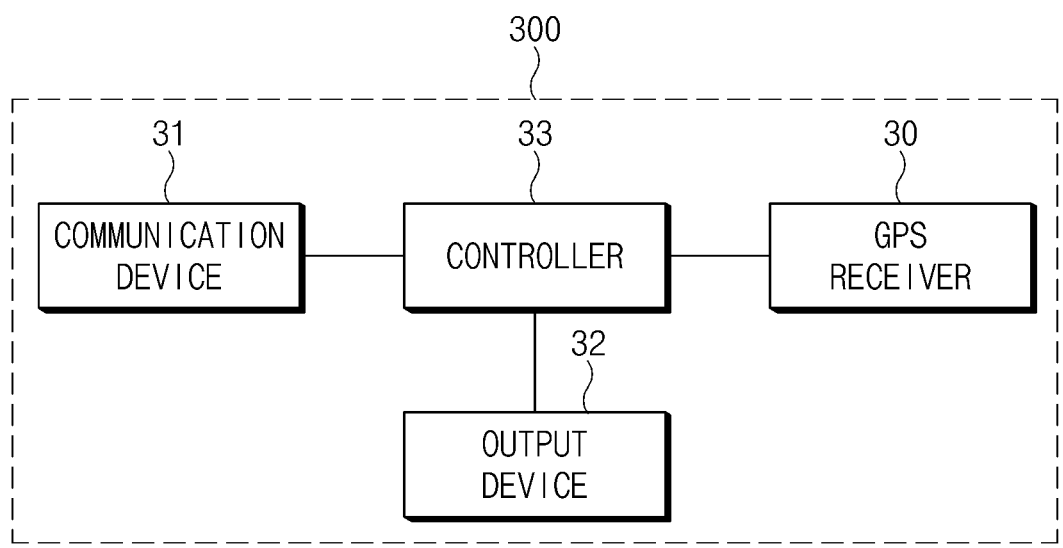
FIG. 4 is a block diagram illustrating the configuration of a tractor provided in a system for controlling logistics transportation, according to various exemplary embodiments of the present invention.

FIG. 4 is a block diagram illustrating the configuration of a tractor provided in a system for controlling logistics transportation, according to various exemplary embodiments of the present invention.

As illustrated in FIG. 4, according to various exemplary embodiments of the present invention, the tractor 300 in the system for controlling logistics transportation may include a GPS receiver 30, a communication device 31, an output device 32, and a controller 33. In the instant case, according to various exemplary embodiments of the present invention, the components may be combined into each other to be implemented in one form, or some components may be omitted, depending on the manners of reproducing the tractor 300 provided in the system for controlling logistics transportation.

Regarding the components, the GPS receiver 30 may receive GPS position information of the tractor 300.

The communication device 31, which is a module to provide a communication interface of the control server 100, may receive the position information (warehouse number) of the trailer from the control server 100 and may transmit the information on the position of the tractor 300 to the control server 100.

The output device 32 may output the information (a warehouse number) on the position of the tractor 300. In the instant case, the output device 32 may include a display.

The controller 33 may perform the overall control such that the components normally perform the respective functions. Furthermore, the controller 33 may be implemented in a form of hardware or software, and may be implemented in a form of the combination of the hardware and the software. The controller 33 may be implemented with a microprocessor, but the present invention is not limited thereto.

The controller 33 may control the communication device 31 to receive the information on the position of the trailer from the control server 100, and to transmit the information on the position of the tractor 300 to the control server 100.

The controller 33 may decrypt the information on the position of the trailer, which is received from the control server 100, when the information on the position of the trailer is encrypted.

Figure 5:
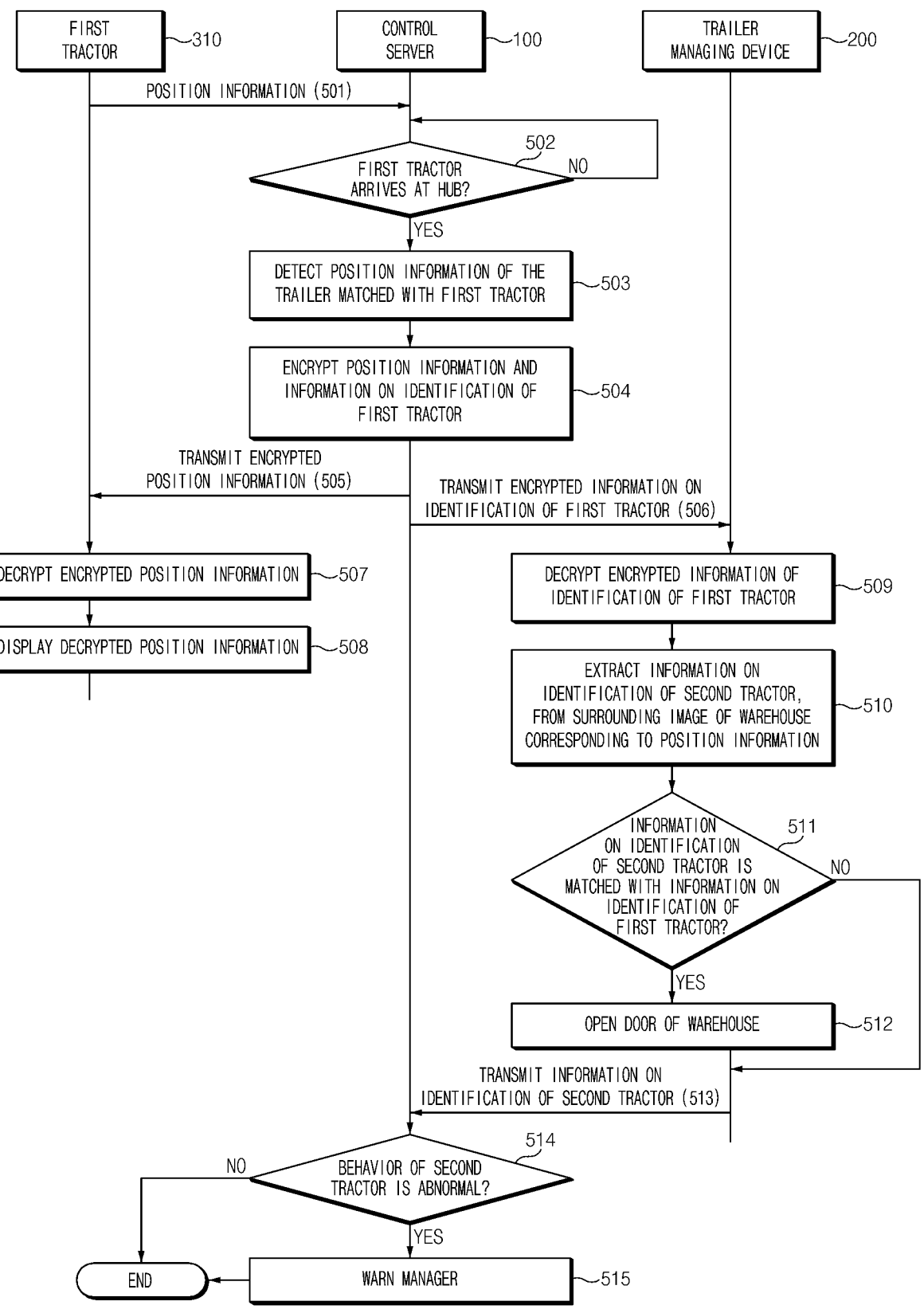
FIG. 5 is a flowchart illustrating a method for controlling logistics transportation, according to various exemplary embodiments of the present invention.

FIG. 5 is a flowchart illustrating a method for controlling logistics transportation, according to various exemplary embodiments of the present invention.

First, the first tractor 310 transmits information on a position of the first tractor 310 to the control server 100 (501). In the instant case, the information on the position of the first tractor 310 may include information on the identification of the first tractor 310.

Thereafter, the control server 100 authenticates the first tractor 310, and determines whether the first tractor 310 arrives at a hub (or a warehouse), based on the information of the position of the first tractor 310, when the first tractor 310 is authenticated (502).

Thereafter, when the first tractor 310 arrives at the hub (or the warehouse), the control server 100 detects position information (a warehouse number) of a trailer to be transported by the first tractor 310, based on the table stored in the storage 20 (503). In other words, the control server 100 detects the position information of the trailer matched with the first tractor 310.

Thereafter, the control server 100 encrypts the detected position information and the information on the identification of the first tractor 310 (504). In the instant case, the encryption scheme is a scheme well-known to those skilled in the art.

Thereafter, the control server 100 may transmit the encrypted position information to the first tractor 310 (505), and may transmit the encrypted information on the identification of the first tractor 310 to the trailer managing device 200 (506).

Thereafter, the first tractor 310 decrypts the encrypted position information received from the control server 100 (507). In the instant case, when the first tractor 310 is an autonomous driving vehicle, the first tractor 310 self-drives to a place, in which the warehouse is positioned, based on the encrypted position information. When the first tractor 310 is a general vehicle, the first tractor 310 may display the decrypted position information to provide the position information to a driver (508).

Thereafter, the trailer managing device 200 decrypts the encrypted information on the identification of the first tractor 310, which is received from the control server 100 (509).

Thereafter, the trailer managing device 200 extracts information on the identification of the second tractor 320, from the surrounding image of the warehouse corresponding to the position information, based on the table stored in the storage 20 (510). In other words, the trailer managing device 200 may extract the information on the identification of the second tractor 320, from an image captured by the camera 22. In the instant case, the camera 22 may be positioned in the vicinity (for example, an entrance) of the warehouse matched with the first tractor 310.

Thereafter, the trailer managing device 200 determines whether the extracted information on the identification of the second tractor 320 is matched with the received information on the identification of the first tractor 310 (511).

The trailer managing device 200 opens the door of the warehouse (512), when the extracted information on the identification of the second tractor 320 is matched with the received information on the identification of the first tractor 310, as the determination result (511).

Thereafter, the trailer managing device 200 transmits the information on the identification of the second tractor 320 to the control server 100 (513).

The trailer managing device 200 performs the operation of "513", when the extracted information on the identification of the second tractor 320 is not matched with the received information on the identification of the first tractor 310, as the determination result (511).

Thereafter, the control server 100 may monitor the behavior of the second tractor 320, and may warn a manager when an abnormal behavior is detected (514 and 515). In the instant case, the abnormal behavior of the second tractor 320 may include the case that the second tractor 320 stands by around the warehouse for a predetermined time period or the case that the second tractor 320 wanders (turns) around the warehouse.

Figure 6:
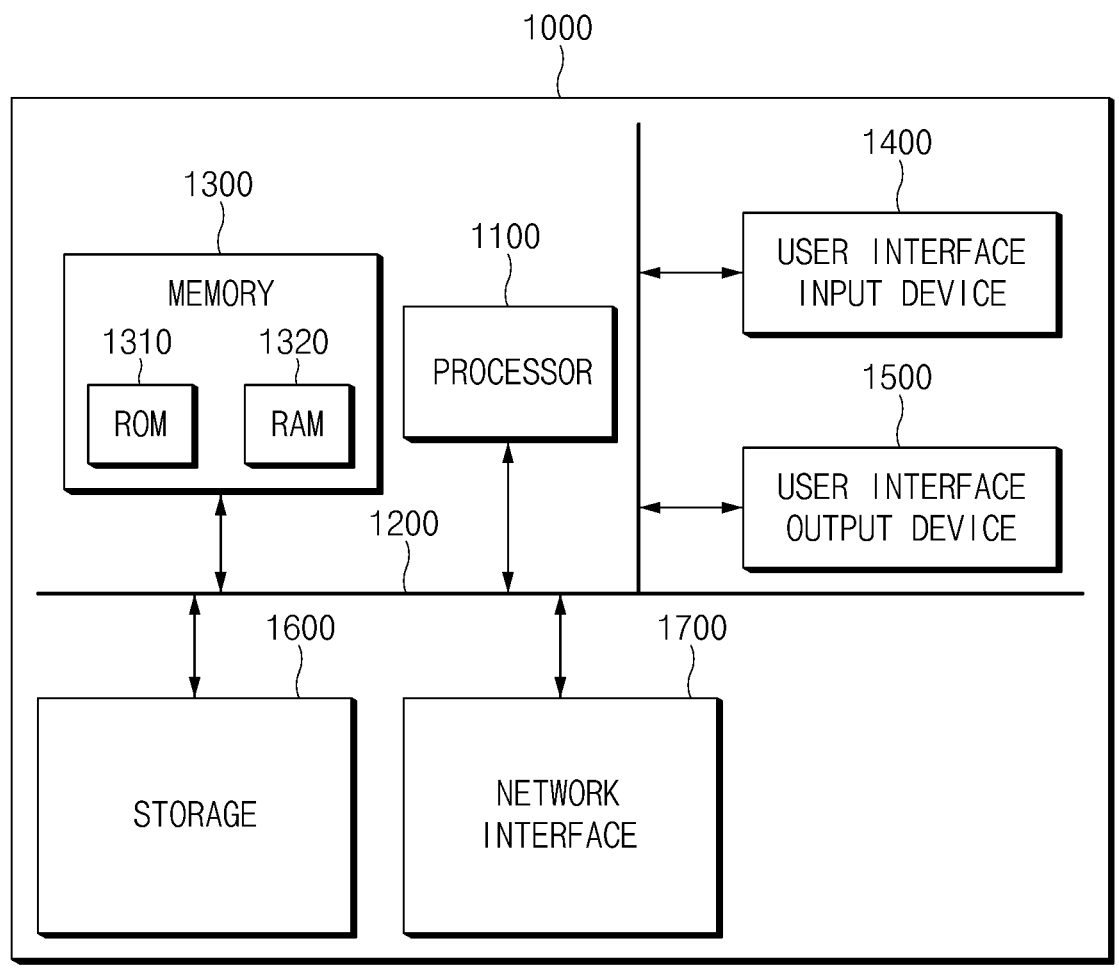
FIG. 6 is a block diagram illustrating a computing system to execute a method for controlling logistics transportation, according to various exemplary embodiments of the present invention.

FIG. 6 is a block diagram illustrating a computing system to execute a method for controlling logistics transportation, according to various exemplary embodiments of the present invention.

Referring to FIG. 6, according to various exemplary embodiments of the present invention, the method for controlling logistics transportation may be implemented through the computing system. A computing system 1000 may include at least one processor 1100, a memory 1300, a user interface input device 1400, a user interface output device 1500, a storage 1600, and a network interface 1700, which are connected to each other via a system bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the exemplary embodiments included in various exemplary embodiments of the present invention may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, in the system for controlling logistics transportation and the method for the same according to various exemplary embodiments of the present invention, the control server may transmit position information of a trailer, which is to be transported by a tractor authenticated, to the tractor, and transmit information on an identification of the tractor to a trailer managing device. The trailer managing device may identify the tractor and open a door of the warehouse corresponding to the position information of the trailer. Accordingly, the tractor may be prevented from transporting a trailer different from trailer allocated to the tractor in advance, and the plurality of trailers may be safely managed.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling logistics transportation, the system comprising: a control server configured to transmit position information of a trailer to a first autonomous tractor; and a trailer managing device configured to i receive information on an identification of the first autonomous tractor from the control server; extract information on an identification of a second autonomous tractor from a surrounding image of a warehouse corresponding to the position information of the trailer and open a door of the warehouse when the extracted information on the identification of the second autonomous tractor is matched with the received information on the identification of the first autonomous tractor wherein the control server is further configured to: periodically receive the information on the identification of the second autonomous tractor from the trailer managing device; and warn a manager, when the second autonomous tractor turns around the warehouse.

2. The system of claim 1, wherein the control server is configured to manage the position information of the trailer, and to manage the information on the identification of the first autonomous tractor, which is matched with the position information of the trailer.

3. The system of claim 1, wherein the control server is configured to: receive information on a position of the first autonomous tractor; and transmit the position information of the trailer to the first autonomous tractor, when the first autonomous tractor is adjacent to the warehouse.

4. The system of claim 1, wherein the control server is configured to: encrypt the position information of the trailer to transmit the encrypted position information of the trailer to the first autonomous tractor; and encrypt the information on the identification of the first autonomous tractor to transmit the encrypted information on the identification of the first autonomous tractor to the trailer managing device.

5. The system of claim 1, wherein the control server is configured to: periodically receive the information on the identification of the second autonomous tractor, from the trailer managing device; and warn the manager, when the second autonomous tractor stands by around the ware house for a predetermined time period.

6. The system of claim 1, wherein the trailer managing device is configured to: decrypt an encrypted information on the identification of the first autonomous tractor, when receiving the encrypted information on the identification of the first autonomous tractor from the control server.

7. The system of claim 1, wherein the trailer managing device is configured to transmit the extracted information on the identification of the second autonomous tractor to the control server.

8. The system of claim 1, wherein the first autonomous tractor is configured to transmit information on a position of the first autonomous tractor to the control server.

9. The system of claim 1, wherein the first autonomous tractor is configured to decrypt an encrypted position information, when receiving the encrypted position information from the control server.

10. The system of claim 9, wherein the first autonomous tractor is configured to display the encrypted position information.

11. A method for controlling logistics transportation, the method comprising: transmitting, by a control server, position information of a trailer to a first autonomous tractor; receiving, by a trailer managing device, information on an identification of the first autonomous tractor from the control server; extracting, by the trailer managing device, information on an identification of a second autonomous tractor from a surrounding image of a warehouse corresponding to the position information of the trailer; opening, by the trailer managing device, a door of the warehouse when the extracted information on the identification of the second autonomous tractor is matched with the received information on the identification of the first autonomous tractor; periodically receiving, by the control server, the information on the identification of the second autonomous tractor, from the trailer managing device; and warning, by the control server, a manager when the second autonomous tractor turns around the ware house.

12. The method of claim 11, wherein the transmitting of the position information of the trailer to the autonomous tractor includes: managing the position information of the trailer on the warehouse in which the trailer is positioned; and managing the information on the identification of the first autonomous tractor, which is matched with the position information of the trailer.

13. The method of claim 11, wherein the transmitting of the position information of the trailer to the autonomous tractor includes: receiving information on a position of the first autonomous tractor; and transmitting, to the first autonomous tractor, the position information of the trailer, when the first autonomous tractor is adjacent to the warehouse.

14. The method of claim 11 further including: periodically receiving, by the control server, the information on the identification of the second autonomous tractor, from the trailer managing device; and warning, by the control server, the manager, when the second autonomous tractor stands by around the warehouse for a predetermined time period.

15. The method of claim 11, wherein the extracting of the information on the identification of the second autonomous tractor includes: periodically transmitting the extracted information on the identification of the second autonomous tractor to the control server.

16. The method of claim 11 further including: displaying, by the first autonomous tractor, the position information of the trailer received from the control server.

\* \* \* \* \*